March 3, 1953     R. J. WISE     2,630,495
PHASING AND SYNCHRONIZING DEVICE FOR FACSIMILE MACHINES
Filed Feb. 26, 1947     2 SHEETS—SHEET 1
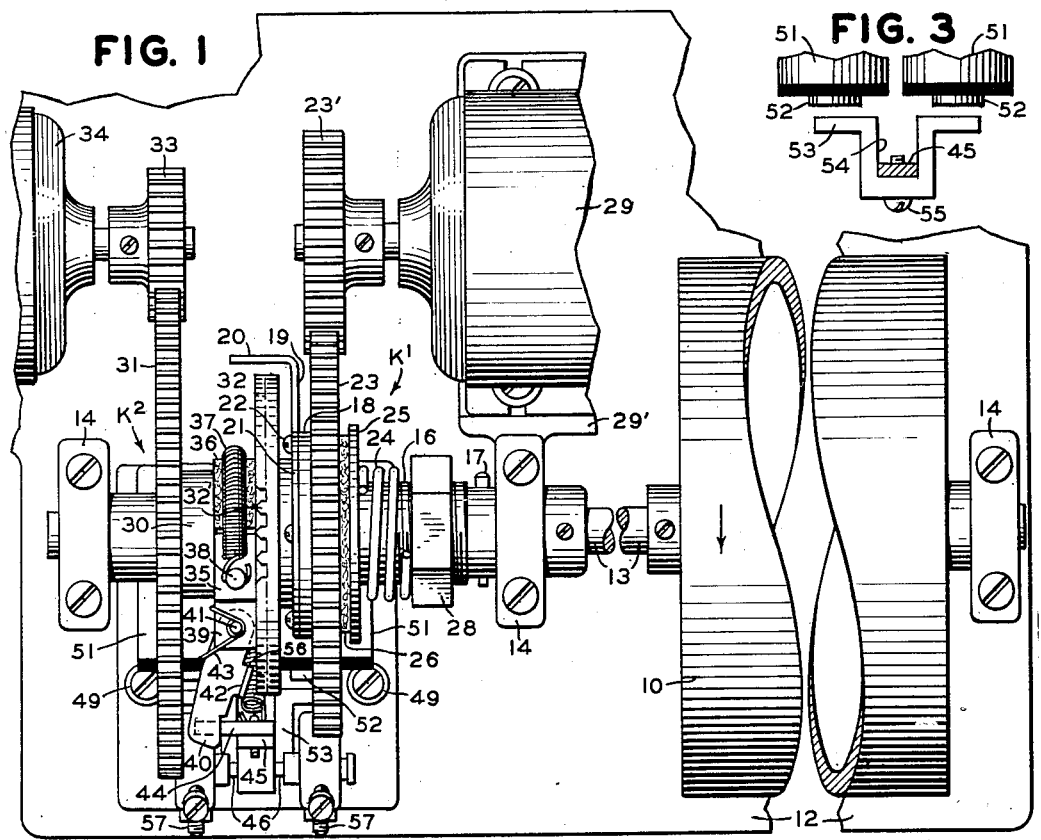
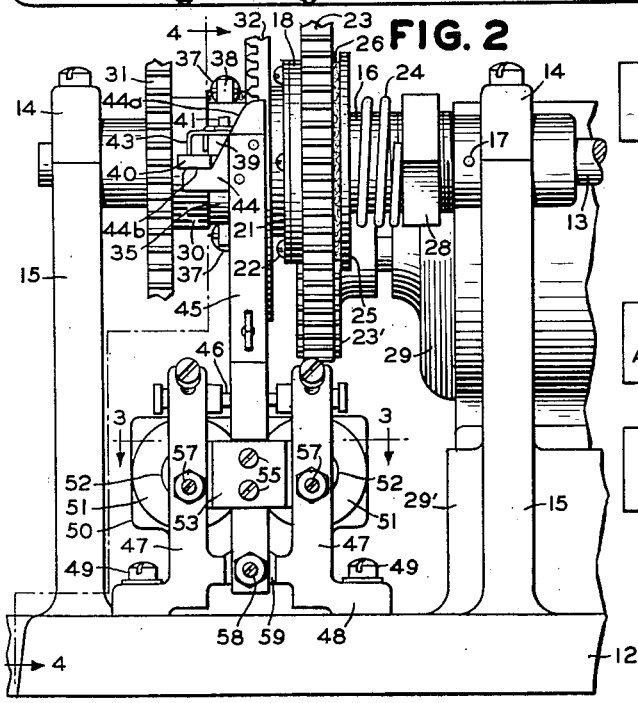
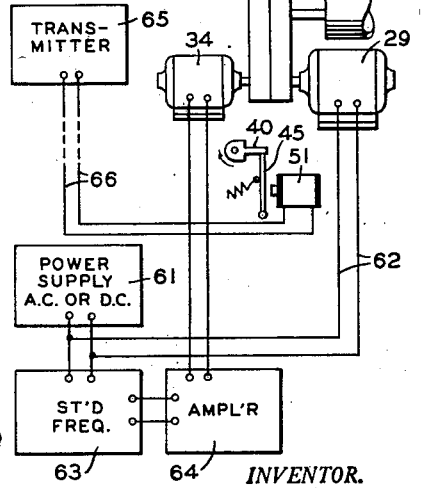
INVENTOR.
R. J. WISE
BY A. A. Thomas
ATTORNEY March 3, 1953     R. J. WISE     2,630,495
PHASING AND SYNCHRONIZING DEVICE FOR FACSIMILE MACHINES
Filed Feb. 26, 1947     2 SHEETS—SHEET 2
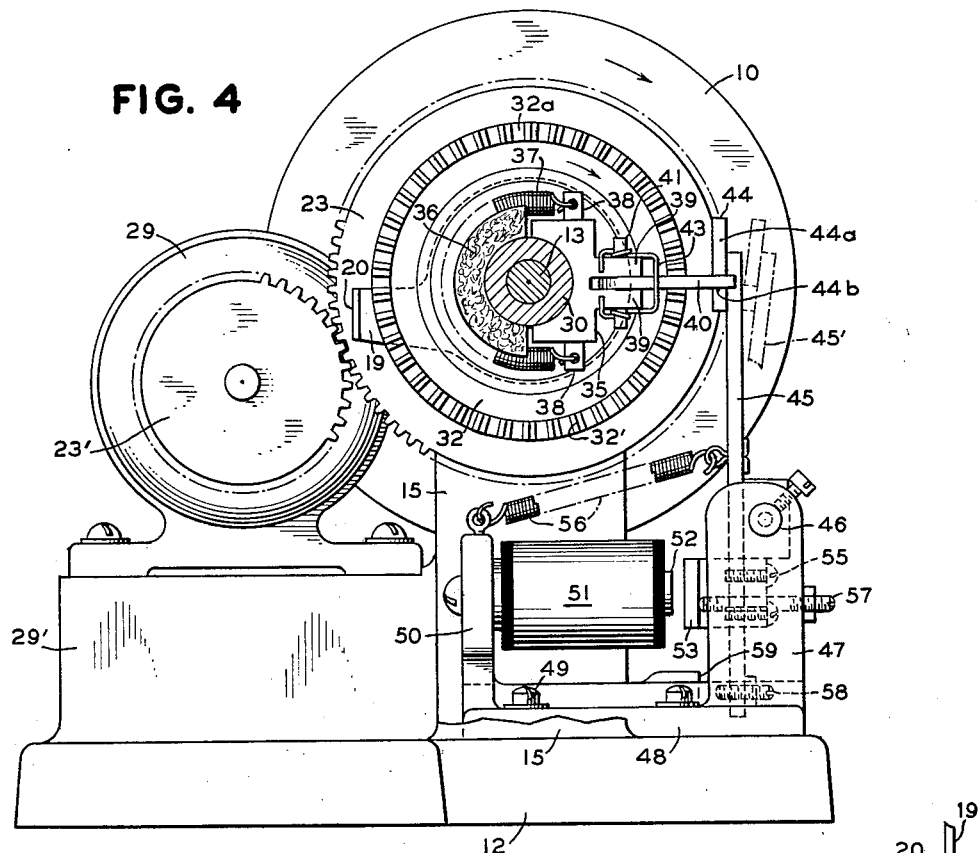
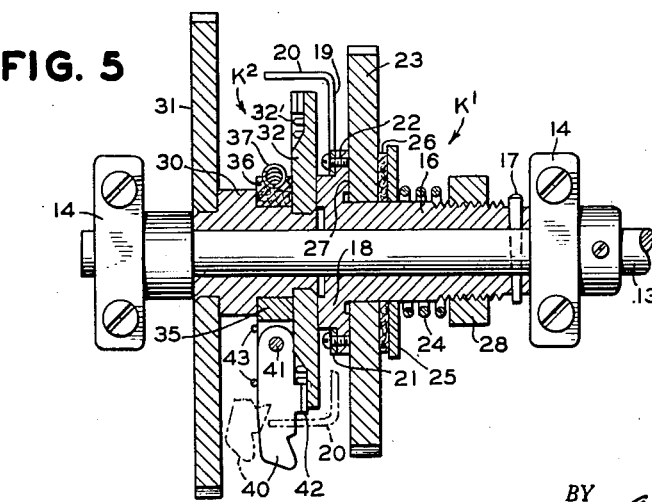
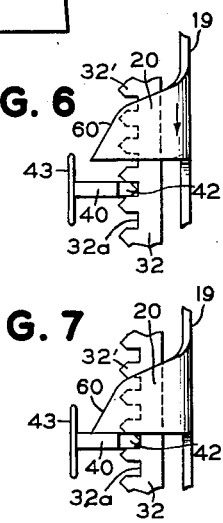
INVENTOR.
R. J. WISE
BY
ATTORNEY Patented Mar. 3, 1953

2,630,495

UNITED STATES PATENT OFFICE 2,630,495

PHASING AND SYNCHRONIZING DEVICE FOR FACSIMILE MACHINES

Raleigh J. Wise, Arlington, N. J., assignor to The Western Union Telegraph Company, New York, N. Y., a corporation of New York Application February 26, 1947, Serial No. 731,143

16 Claims. (Cl. 178—69.5)

My invention relates to facsimile machines and its object is to provide a novel device for phasing and driving heavy scanning mechanisms with a high accuracy of synchronism which is so essential in machines of this type.

It is well known that in facsimile transmission the scanning members in the transmitter and receiver must operate not only in synchronism but also in phase with each other so that the recorded copy will be framed like the original. This phasing of the two machines is controlled by means of a phasing pulse or signal usually sent from the transmitter to the recorder where a magnet is energized to couple the recording shaft to its driving motor.

Heretofore the phasing magnet at the recorder would start the operation of the scanning shaft in two ways, depending on the construction of the machine. In some cases, the recording drum is connected to a synchronous motor through a friction clutch and the drum shaft is normally held locked against rotation. When the phasing magnet is energized, the drum is automatically released and is rotated through the motor driven friction clutch. An example of this phasing arrangement appears in Fig. 13 of Wise Patent 2,315,361. In other types of facsimile recorders there is a positive clutch interposed between the motor shaft and the drum shaft. This clutch is normally open so that the rotation of the motor shaft has no effect on the drum. When the phasing magnet is energized, it operates the clutch to establish a positive drive between the motor and the drum shaft. This type of phasing device is shown in Rudd Patent 2,330,386.

In facsimile machines having scanning mechanism with little inertia, as where small light drums are used, the phasing arrangements above mentioned have been found satisfactory. However, in machines provided with heavy metal drums or other parts of a scanning mechanism possessing considerable inertia, new problems arise in connection with the use of synchronous motors for operating those heavy scanning parts. To begin with, it is necessary or highly desirable in facsimile systems to use small synchronous motors of low power consumption for operating the scanning mechanism. Those small motors are run from a standard frequency unit which is energized from a storage battery or a commercial circuit, A. C. or D. C. The frequency unit has a low power output which is amplified by a power amplifier to which the synchronous motor is connected. This amplifier, which is usually of the vacuum tube type, is sufficient to operate a small synchronous motor but it cannot take care of heavy motors.

The foregoing arrangement of operating small synchronous motors in facsimile machine is necessary to permit the use of transmitters and recorders in locations which have different sources of electric power. For example, in a long-distance system the transmitter might be in a D. C. district and the recorder in an A. C. district. Obviously, under those conditions it would be impossible to synchronize the two machines with motors operated from the different kinds of power supplies. Hence, the necessity of providing facsimile machines with small spnchronous motors which can be operated from any available source of power through a standard frequency unit of low output which is amplified for motor operation.

Now, while those small synchronous motors are adequate for scanning mechanisms of little inertia, they have not sufficient power to operate the heavy scanning parts used in certain facsimile machines. Obviously, the substitution of a more powerful motor is out of the question for reasons already explained. To solve this difficulty I have provided a novel phasing and driving device whereby a tiny synchronous motor operates a heavy drum or other part of a scanning mechanism in phased synchronism with the other machine of the system.

Briefly stated, my invention comprises a clutch device composed of two parts mounted on a scanning shaft and normally rotatable independently of each other. One clutch part is keyed to the shaft and is operated by a non-synchronous auxiliary motor at a speed slightly above or below the scanning speed of the shaft. The second clutch part is mounted idly on the scanning shaft and is rotated at scanning speed by a small synchronous motor which is operated from a standard frequency source through an amplifier, according to approved practice. The second or synchronous part of the clutch mechanism carries a latch which is normally held in a certain angular position by a phasing magnet.

The normal disconnection of the clutch parts from each other allows the auxiliary motor to drive the shaft at non-scanning speed before machine is phased. Although the synchronous motor is also running at that time, its clutch part turns idly on the shaft. When the magnet is energized by a phasing signal, the latch moves into locking position where it is overtaken by the first clutch part. In this way the two clutch parts become coupled and are driven at scanning speed by the synchronous motor.

Because the scanning shaft is already running when the synchronous motor picks up the drive, the shock of a sudden heavy load on this small motor is eliminated. The auxiliary motor assists the synchronous motor with a constant torque so that the load on the synchronous motor is small during the scanning operation of the shaft. Consequently, I can use a very small low-power motor for operating heavy transmitting or recording mechanisms at scanning speed with a high degree of accuracy.

The novel features and practical advantages of my invention will be fully understood from a description of the accompanying drawings, in which:

Fig. 1 is a top view of a facsimile machine equipped with my new phasing and driving mechanism;

Fig. 2 represents a front view of the machine;

Fig. 3 is a section on line 3—3 of Fig. 2;

Fig. 4 is a section on line 4—4 of Fig. 2;

Fig. 5 shows an axial cross-section of the clutch mechanism;

Figs. 6 and 7 are detail views showing how the two clutch parts are coupled together; and Fig. 8 is a simplified circuit diagram of the power connections for the two motors.

Since my invention is applicable to any form or type of facsimile machine, transmitter or recorder, having a scanning mechanism of considerable inertia, it will not be necessary to show or describe any details of the machine or its scanning mechanism. It suffices to say that I have shown a heavy drum 10 to represent any type or form of facsimile scanning mechanism having considerable inertia. The drum 10, suitably supported on a base shaft 12, has a rotary shaft 13 with an extending end mounted in bearings 14 carried by standards 15 which rise from the base plate. I shall designate the shaft 13 a scanning shaft, by which I mean, in the broader aspects of my invention, a shaft adapted to operate any practical form of scanning mechanism, whether for transmitting or recording facsimile subject matter.

The novel phasing and driving mechanism of this invention comprises a clutch device which consists of two main parts or units K1 and K2, both mounted on the shaft 13.

The clutch part K1 includes a sleeve or bushing 16 (Fig. 5) secured to shaft 13 in any practical way, as by a key or pin 17. One end of sleeve 16 terminates in a circular head 18 which carries a rigid arm 19 provided with a lateral flange or extension 20. A simple way to fix the arm 19 in place is by means of a ring 21 which is integral with the arm and is attached to the sleeve head 18 by screws or rivets 22. The arm 19 therefore always rotates with the shaft 13.

A driving gear 23 is frictionally mounted on sleeve 16. In the present instance an expanding coil spring 24 on sleeve 16 presses against a metal washer 25 and a friction disk 26, both of which are loosely mounted on the sleeve so as to slide and turn thereon when necessary. The friction disk 26, which is usually of felt or rubber, bears directly against the gear 23. In this way the gear is held in pressure contact between the friction disk 26 and the circular face 27 of sleeve 16 whereby the gear is frictionally coupled to shaft 13 for operating the same at non-scanning speed prior to the phasing of drum 10, as will be explained later. The tension of spring 24 is adjustable by means of a nut 28 on the screw threaded portion of sleeve 16, so that the frictional connection between shaft 13 and gear 23 can be regulated to the right degree of tightness.

The gear 23 is driven by a non-synchronous motor 29 through a reducing pinion 23' fixed on the motor shaft. The motor 29 is mounted on a block 29' which may be cast integral with the base plate 12 of the machine. The driving connections between motor 29 and shaft 13 are so calculated that normally this motor drives the shaft at a speed slightly above or below the scanning speed of the drum 10. The reason for this non-synchronous operation of the drum will presently become clear.

The second part or unit K2 of the clutch has a hub 30 rotatably mounted on the drum shaft 13. A driving gear 31 is fixed on the outer end of hub 30 and a toothed wheel 32 is secured to the inner end of the hub. Accordingly, the three members 30, 31 and 32 always operate as a unit. The teeth 32' of the clutch wheel 32 are preferably square instead of sloping; that is, the sides of the teeth are parallel to provide square locking slots 32a, as shown in Figs. 6 and 7.

The gear 31 meshes with a pinion 33 on the shaft of a small synchronous motor 34 which is supported in any suitable way on the base plate 12. The drive members 33 and 31 are so geared that the synchronous motor 34 rotates the toothed wheel 32 at the prescribed scanning speed of the drum 10. I would point out here that the synchronous motor 34 is too small to drive the heavy drum by itself and needs the help of the non-synchronous auxiliary motor 29. This help is automatically obtained at the right moment in the manner now to be described.

A block 35 is mounted on the hub 30 by frictional means so that the hub can rotate while the block remains stationary. As best shown in Fig. 4, a half-ringed friction pad 36 of felt, rubber, or the like, is held against the hub 30 by a contracting coil spring 37 which is attached at its terminals to ears 38 at the opposite ends of block 35. The constant tendency of spring 37 to contract holds the block 35 and the friction pad 36 pressed tightly against the hub 30.

The block 35 is provided with a pair of spaced lugs 39 between which a latch 40 is pivoted on a cross pin 41 carried by the lugs. The latch 40, which is radial with respect to shaft 13, has a projection 42 adapted to enter the slot 32a of clutch wheel 32 (see Figs. 6 and 7) when the latch is free to do so. The edges of the teeth 32' and projection 42 are rounded or bevelled to insure easy interlocking of those members. A spring 43 on lugs 39 constantly urges the pivoted latch 40 toward the toothed wheel 32.

The spring urged latch 40 is held out of contact with the toothed wheel 32 by a stop 44 secured to the upper end of an arm 45 and having a sloping cam edge 44a and a flat locking edge 44b. The stop arm 45 is pivoted on a pin 46, which is mounted at its ends in standards 47 of a bracket 48 conveniently secured to the base 12 by screws or bolts 49. The bracket 48 has a rear plate 50 to which a double electromagnet 51 is attached with the free ends of its poles 52 extending forwardly toward an armature 53 carried by the stop arm 45. The armature 53 may be shaped as shown in Fig. 3 with a recess 54 to receive the arm 45 to which the armature is fastened by screws or rivets 55.

A contractile spring 56 attached at one end to the bracket plate 50 and at the other end to the arm 45 normally holds the latter in locking position, as shown in Figs. 1 and 4, where the end of latch 40 rests on the locking edge 44b of stop 44. An adjustable stop 57 on one or both posts 47 of bracket 48 engages the armature 43 to limit the movement of arm 45 to locking position. When the latch 40 engages the stop 44, the projection 42 is clear of the toothed wheel 32 and the cam edge 44a holds the latch out of the path of the coupling arm 19—20 so that the clutch part K1 and the united members 30, 31, 32 of clutch part K2 can rotate while the latch 40 remains stationary.

The magnet 51 is a phasing magnet and is energized by a phasing pulse or signal from the connected machine, which may be a transmitter or a recorder having a scanning drum that runs in phase with drum 10. This phasing arrangement is well known to facsimile engineers and need not be further described. Referring to Fig. 4, when the magnet 51 is energized, it rocks the arm 45 clockwise to releasing position, as indicated by the dotted outline 45'. On withdrawal of the stop 44, the spring 43 throws the released latch 40 against the teeth of wheel 32 and those two parts are locked together so that the latch now rotates with the wheel as a unit. The movement of arm 45 to latch releasing position 45' is limited by an adjustable stop 58 on the lower end of the arm. This stop abuts against a cross-piece 59 of bracket 48. The latch 40 is a small light member of negligible inertia and responds instantly to its release by magnet 51.

The operation of the double action clutch mechanism K1—K2 will be clear from the following description. Before the phasing signal is received, which means before the magnet 51 is energized, the latch 40 is held locked in its predetermined angular position by the stop 44. Consequently the clutch parts K1 and K2 are disconnected and can rotate independently of each other. Assuming for example that the scanning speed of drum 10 in this particular machine is 180 R. P. M., the motor 29 is so geared to shaft 13 as to drive it a little faster or a little slower than the prescribed scanning speed, preferably faster. So let us say that the non-synchronous motor 29, which is powerful enough for that purpose, operates the drum 10 at 200 R. P. M. through the clutch part K1 which is geared to the shaft 13. At the same time the synchronous motor 34 rotates the idle clutch unit K2 at scanning speed, but this operation has no effect on shaft 13 because the two clutch units K1—K2 are still disconnected. The latch 40, of course, remains stationary. Thus, before phasing of the machine, the heavy drum 10 is running faster than the required scanning speed.

When the phasing signal energizes the magnet 51 and thereby withdraws the stop 44, the latch 40 is instantly thrown by the spring 43 into locking engagement with the toothed wheel 32. The phased latch 40 thereupon rotates with the wheel 32 at scanning speed in the path of the overhanging end 20 of arm 19 on clutch part K1. Since the arm 19 rotates faster than the latch 40, it soon overtakes the latter and pushes against it, as shown in Fig. 7, whereby the two clutch units K1 and K2 are coupled together and rotate in unison with the synchronous motor 34. Consequently the heavy drum 10 is now being operated at scanning speed by a small synchronous motor 34 which holds the coupling arm 19 in phase while the gear 23 continues to slip in its friction clutch 26. The latch 40 is the phasing element of the clutch mechanism K1—K2 because at the phasing moment, as determined by the energizing of magnet 51, it effects a mechanical coupling between the synchronous motor 34 and the heavy drum 10.

It is clear that the running of shaft 13 before the synchronous motor takes over relieves the latter of the shock of a sudden load and eliminates the phasing impact which would choke down this small motor. This shockless phasing of the heavy scanning member 10 by mechanically coupling the synchronous motor to the drum after the latter has been brought to the approximate scanning speed constitutes the main object of my invention. The practical result of this feature is a facsimile machine which experiences no shock or vibration during the phasing of its heavy drum, so that it runs quietly at all times. Also, by avoiding heavy motors and clutches the machine is less expensive and cumbersome than prior devices of that kind.

Further, the load of the running drum is assumed mainly by the separate motor 29 which applies a continuous torque to shaft 13 during the synchronous operation of the drum. Even if the speed of motor 29 should be unsteady due to fluctuations in the line circuit, that would not affect or interfere with the scanning speed of the drum, for the synchronously driven latch 40 will always hold the drum arm 19 in phase. As a result I attain a high accuracy of synchronism in the scanning operation of drum 10.

If the auxiliary motor 29 drives the shaft 13 above scanning speed, which is the preferred operation, it may be said that the synchronous motor 34 acts as a brake for the other motor to hold the drum shaft down to the prescribed scanning speed. If the drum shaft 13 is operated below scanning speed by the motor 29, the synchronously driven latch 40 will overtake the arm 19 and push it ahead at the scanning speed of the drum. In either case the separate motor 29 assists the small synchronous motor 24 by applying a constant torque to the drum shaft.

When the phasing magnet 51 is deenergized, the spring 56 pulls the arm 45 back to normal position where the stop 44 is in the path of the rotating latch 40. As the latch strikes the sloping upper edge 44a of stop 44, it is cammed sideways out of contact with the teeth of wheel 32 and out of the path of the drum arm 19. The flat edge 44b of stop 40 holds the friction mounted latch 40 in its predetermined angular phasing position while the toothed wheel 32 continues to rotate.

It may sometimes happen in the operation of the machine that the drum 10 and shaft 13 are temporarily stopped while the motors 29 and 34 keep running. In that case the latch 40 would continue to rotate (clockwise as viewed in Fig. 4) while the arm 19 stood still. To permit continued operation of clutch unit K2 under those conditions I provide the coupling flange 20 of arm 19 with a sloping rear edge 60 (see Figs. 6 and 7). When the rotating latch 40, which is still locked to the wheel 32, encounters the flange 20 of the stationary arm 19, the latch slips over the sloping edge 60. Thus for a moment the latch leaves the teeth of wheel 32 and then snaps back again without losing its angular position and phase.

Fig. 8 represents a simplified diagram of the power circuits for the two motors 29 and 34. Let 61 designate any suitable source of electric power which may be a storage battery or a commercial power line, either A. C. or D. C. The non-synchronous auxiliary motor 29 is connected directly to the power source 61 by the lines 62. A standard frequency unit 63 (usually 60 cycles) is connected to the power source 61 and a synchronous power amplifier 64 is connected to the frequency unit, which has a low power output requiring amplification. The synchronous motor 34 is connected to the output of amplifier 64, which may be of the vacuum tube type. With this arrangement I can use a miniature synchronous motor of no more than 0.005 H. P. which receives 12 or 15 watts from the synchronous amplifier 64. The frequency unit keeps the motor 34 running in strict synchronism without regard to fluctuations in the lines of the power supply. The phasing magnet 51 is controlled from the connected machine 65 (whether transmitter or recorder) through lines 66 in accordance with any approved phasing system.

While I have shown and described a specific mechanism for operating a facsimile drum at scanning speed by means of a synchronous motor too small to operate the drum alone, I would have it understood that my invention is not limited to the details set forth. Various changes and modifications may be resorted to within the scope of the appended claims.

I claim as my invention:

1. In facsimile phasing and synchronizing apparatus, the combination of a scanning shaft, a clutch device comprising two main rotary parts mounted on said shaft, one part being loose on the shaft and the other part being keyed to the shaft, whereby the two parts can normally rotate independently of each other, a synchronous motor for driving the first clutch part at scanning speed, an auxiliary motor connected to the second part of the clutch through a frictional drive for rotating said shaft at non-scanning speed, a toothed wheel carried by the first clutch part, a latch frictionally mounted on said first part and urged towards said toothed wheel, a stop for normally holding said latch free of said wheel in a certain radial position which represents the phasing angle of said shaft, a phasing magnet adapted when energized to remove said stop from the latch which thereupon moves into locking engagement with said toothed wheel, and a member on the second clutch part arranged to engage said latch in phased position, whereby the two separately driven clutch parts are coupled together, said latch holding said shaft at the scanning speed of the synchronous motor.

2. In facsimile phasing and synchronizing apparatus, a heavy drum required to be phased and rotated at scanning speed, a shaft for said drum, a driving assembly mounted on said shaft, said assembly comprising one part rotatable on said shaft and another part connected to the shaft, said two parts being normally disconnected, a small synchronous motor connected to the first driving part for operating the same at the scanning speed of the drum, an auxiliary motor connected to the second driving part for operating said shaft at non-scanning speed, a common power supply for both of said motors, said auxiliary motor being connected directly to said power supply from which it receives sufficient power to operate said drum independently of the synchronous motor, a frequency unit of low output connected to said power supply, a synchronous power amplifier connected to the output of said frequency unit, said synchronous motor being connected to said amplifier which energizes said motor with insufficient power to operate the drum independently of said auxiliary motor, and means including a phasing element for connecting the two parts of said driving assembly in such a way that the synchronous motor drives the drum at scanning speed while the auxiliary motor continues to apply torque to the drum shaft.

3. Phasing and synchronizing apparatus for a facsimile machine comprising a rotary scanning shaft, a synchronous motor normally disconnected from said shaft, a second motor yieldingly connected to said shaft and tending to drive the same at non-scanning speed, circuits for energizing said motors simultaneously, a coupling member rotatably mounted on said shaft and adapted to be operated by said synchronous motor at scanning speed, a second coupling member fixed on said shaft and operated by the second motor, connections for normally holding the first coupling member stationary at a certain angle out of engagement with the second coupling member, and a magnet adapted when energized to operate said connections and thereby release the first coupling member for engagement with the second member after said shaft has been brought to approximate scanning speed by the second motor, the engagement of said coupling members connecting the synchronous motor to said shaft which is thereby rotated at scanning speed by the combined action of both motors.

4. In a facsimile machine having a rotary scanning shaft, phasing and synchronizing apparatus for said shaft comprising a member rotatable on said shaft, a synchronous motor connected to said member for operating the same at scanning speed, an auxiliary motor connected to said shaft for operating the same at near-scanning speed, two rotary coupling elements mounted on said shaft and normally disconnected, one of said elements being connected to said member and the other element being connected to said shaft, whereby said member and said shaft are normally free to rotate independently of each other at their respective speeds, and a device energized by a phasing pulse for connecting said elements together to establish a mechanical driving connection between said member and said shaft, whereby the synchronous motor is automatically connected to said shaft and applies torque thereto after the shaft has been brought up to speed by the auxiliary motor.

5. In a facsimile machine having a rotary scanning drum, phasing and synchronizing apparatus for said drum comprising a motor for starting said drum from rest and driving it at near-scanning speed, a gear normally disconnected from said drum, a synchronous motor for driving said gear at a speed corresponding to the scanning speed of the drum, coupling mechanism interposed between said drum and gear, said mechanism having one part permanently connected with said drum and a second part permanently connected with said gear, means for mounting said parts so that normally they are disconnected, whereby the synchronous motor can rotate the gear at scanning speed while the drum is rotated at near-scanning speed by said first motor, and a device energized by a phasing pulse for connecting said parts together to establish a mechanical driving connection between the running drum and said gear, whereby the synchronous motor applies torque to the drum and automatically takes over the control of the running drum at the phasing moment and operates it at scanning speed.

6. In a facsimile machine having a rotary scanning shaft, phasing and synchronizing apparatus for said shaft comprising a sleeve rotatably mounted on said shaft, a synchronous motor connected to said sleeve for driving the same at scanning speed, a coupling element driven by said shaft, an auxiliary motor for operating said shaft at near-scanning speed independently of said synchronous motor, clutch mechanism mounted on said sleeve and normally disconnected from said coupling element so that said sleeve and shaft can rotate at the same time independently of each other at their respective speeds, and a device energized by a phasing pulse for automatically connecting said clutch mechanism to said coupling element, whereby said sleeve and clutch mechanism establish a mechanical driving connection between the synchronous motor and said shaft after the shaft has been brought up to near-scanning speed by said auxiliary motor.

7. In facsimile phasing and synchronizing apparatus, the combination of a rotary scanning shaft, driving mechanism for said shaft including a rotary sleeve member mounted loosely on the shaft and a second rotary member permanently connected to the shaft, whereby said two members can normally rotate independently of each other, a synchronous motor for driving the first member at scanning speed, an auxiliary motor for driving the shaft and the second member at near-scanning speed, a latch rotatable with respect to said shaft and first member, a stop for normally holding said latch stationary in a certain angular position while said members are free to rotate at their respective speeds, and means energized by a phasing pulse to remove said stop and cause said latch to couple the two rotary members together, said coupled members establishing a mechanical driving connection between the synchronous motor and said shaft after the shaft has been brought up to speed by the auxiliary motor.

8. In facsimile phasing and synchronizing apparatus, a combination of a rotary scanning shaft, a motor for operating said shaft at near-scanning speed, a sleeve rotatably mounted on said shaft, a synchronous motor for rotating said sleeve at scanning speed while said shaft is being driven at near-scanning speed by said first motor, a wheel fixed on said sleeve, a coupling member connected to said shaft and rotatable therewith, mechanism for establishing a driving connection between said coupling member and said wheel, stop means for normally holding said mechanism in a non-operative condition to permit simultaneous rotation of said shaft and sleeve independently of each other at their respective speeds, and means energized by a phasing pulse for causing said stop means to release said mechanism for the aforesaid driving operation, whereby the synchronous motor is mechanically connected to the scanning shaft by the phasing pulse so as to apply torque to said shaft after the shaft has been brought up to speed by said first motor.

9. In phasing and synchronizing apparatus for a facsimile machine, the combination of a rotary scanning shaft, a sleeve rotatable on said shaft, a synchronous motor for operating said sleeve at scanning speed, an auxiliary motor for operating said shaft at near-scanning speed independently of the synchronous motor, a toothed wheel fixed on said sleeve, a pivoted latch rotatably mounted on said sleeve, a spring tending to urge said pivoted latch against said wheel, a stop for normally holding said latch away from the wheel, means energized by a phasing pulse for operating said stop to release the latch which is thereupon rocked by the spring into coupling engagement with said wheel, and a member connected to said shaft for engaging the phasing latch and thereby coupling the shaft to said sleeve, whereby a mechanical driving connection is automatically established between the synchronous motor and the scanning shaft after said shaft has been started from rest by the auxiliary motor.

10. In facsimile phasing and synchronizing apparatus, the combination of a rotary scanning shaft, a motor for operating said shaft at near-scanning speed, a sleeve rotatably mounted on said shaft, a synchronous motor for rotating said sleeve at scanning speed independently of said shaft, a toothed wheel fixed on said sleeve, a pivoted latch rotatably mounted on said sleeve and releasable to lock with said toothed wheel under certain conditions, a stop for holding said latch stationary while said toothed wheel rotates at scanning speed and said shaft runs at near-scanning speed, means energized by a phasing pulse to remove said stop and release said latch into locking engagement with said toothed wheel, and coupling means connected to said shaft for engaging the phased latch to establish a mechanical driving connection between the synchronous motor and said shaft after the shaft has been brought up to speed by the first motor.

11. In facsimile phasing and synchronizing apparatus, the combination of a scanning shaft, a clutch device comprising two main rotary parts, one part being loosely mounted on the shaft and the other part being connected to the shaft, whereby the two parts can rotate normally independently of each other, a synchronous motor for driving the first clutch part as scanning speed, an auxiliary motor for rotating said shaft and second clutch part at near-scanning speed, a toothed wheel carried by the first clutch part, a latch movably mounted on the first clutch part and normally urged toward said toothed wheel, a stop for normally holding said latch free of said wheel in a certain radial position which represents the phasing angle of said shaft, a phasing magnet adapted when energized to remove said stop from the latch which thereupon moves into locking engagement with said toothed wheel, and means on the second clutch part arranged to engage said latch in phasing position, whereby the two separately driven clutch parts are coupled together and establish a mechanical driving connection between the synchronous motor and the scanning shaft.

12. In a facsimile machine having a rotary shaft for synchronously operating a scanning drum of considerable inertia, phasing and synchronizing apparatus for said shaft comprising a sleeve rotatably mounted on said shaft, a gear fixed on said sleeve, a synchronous motor connected to said gear for operating said sleeve at scanning speed, a toothed wheel fixed on said sleeve, a member rotatably mounted on said sleeve adjacent to said wheel, a latch pivoted on said rotary member and normally tending to engage said toothed wheel, a stop for normally holding said member and latch stationary in a certain angular position, an auxiliary motor for operating said shaft at near-scanning speed while said latch is held stationary, means energized by a phasing pulse to remove said stop and release said latch, which thereupon connects with said wheel, and coupling means rotated by said shaft for connecting the shaft to said sleeve through said latch and wheel after the operation of said phasing means to establish a mechanical driving connection between the synchronous motor and the scanning drum after the drum has been started from rest by the auxiliary motor.

13. In a facsimile machine having a rotary scanning shaft, phasing and synchronizing apparatus for said shaft comprising a toothed wheel rotatable on said shaft, a synchronous motor for operating said wheel at scanning speed, a coupling element movably mounted on said shaft and rotatable with respect to said wheel, means for normally urging said coupling element into driving contact with said wheel, a movable stop for normally holding said coupling element stationary at a certain phasing angle away from said wheel, a second coupling element fixed on said shaft and rotatable therewith in a path clear of the first coupling element when the latter is held stationary, an auxiliary motor for operating said shaft and second coupling element at near-synchronous speed while the two coupling elements remain disconnected, and means energized by a phasing pulse for operating said stop to release the first coupling element for movement into engagement with said wheel and into the path of the second coupling element, which thereby locks with the first coupling element and connects the scanning shaft to said wheel to establish a mechanical driving connection between the synchronous motor and the scanning shaft after the shaft has been brought up to speed by the auxiliary motor.

14. A facsimile machine having a rotary scanning shaft which has a predetermined phasing angle, phasing and synchronizing apparatus for said shaft comprising a synchronous motor normally disconnected from said shaft, an auxiliary motor connected to said shaft independently of said synchronous motor and normally tending to operate said shaft at near-scanning speed, and clutch mechanism operated by a phasing signal for automatically establishing a mechanical driving connection between said synchronous motor and said shaft at the phasing angle thereof after the shaft has been brought to near-scanning speed by said auxiliary motor.

15. In a telefacsimile machine providing with a rotatable scanning member to be driven at predetermined speed and phase relation, in combination, a motor which varies in speed in accordance with its load connected to and normally tending to drive said scanning member at a speed greater than the predetermined speed, a rotatable phasing member connected to said scanning member in such manner as to retard its speed when the phasing member and the scanner member have a predetermined phase relationship, means for supporting the phasing member for rotation independent of said scanning member, means for stopping the phasing member and for releasing the same for rotation when a phasing pulse is received, thereby controlling the angular position of the scanning member when the overdrive of the said member causes it to assume said predetermined phase relation to said phasing member, and means for continuously maintaining the rotative speed of said phasing member at said predetermined speed during operation and thereby limiting the rotation of the scanning member to such speed.

16. In facsimile machine of the character described, in combination, a rotatable scanning member tending to rotate above synchronous speed, a rotatable phasing member connected to said scanning member in such manner as to retard its speed when the scanning member and phasing member have a predetermined phase relationship, means for supporting said phasing member for rotation independent of the scanning member, means for stopping the phasing member and for releasing the same for rotation when a phasing pulse is received, thereby controlling the angular position of the scanning member when in said predetermined phase relationship to said phasing member, and motor means for rotating the scanning member and for controlling the rotative speed of the phasing member to obtain a predetermined synchronous speed thereof and of said scanning member.

RALEIGH J. WISE.

REFERENCES CITED

The following references are of record in the file of this patent:

UNITED STATES PATENTS

| Number | Name | Date |
|---|---|---|
| 2,089,846 | Finch | Aug. 10, 1937 |
| 2,105,897 | Towne | Jan. 18, 1938 |
| 2,280,688 | Cooley | Apr. 21, 1942 |
| 2,329,077 | Nichols | Sept. 7, 1943 |
| 2,404,571 | Finch | July 23, 1946 |
| 2,421,438 | Shonnard | June 3, 1947 |